US012639100B1

(12) United States Patent　　　　　(10) Patent No.:　US 12,639,100 B1
　　　Raghavan et al.　　　　　　　　　　(45) Date of Patent:　　May 26, 2026

(54) CONTAINER ORCHESTRATION USING SILOED AVAILABILITY ZONES

(71) Applicant: Confluent, Inc., Mountain View, CA (US)

(72) Inventors: Prachetaa Raghavan, Sammamish, WA (US); Ajit Yagaty, Sammamish, WA (US); Roger Hoover, San Mateo, CA (US); Godwin Pang, Pasadena, CA (US); Sahil Gandhi, Morgan Hill, CA (US); Thomas Snyder, New York, NY (US); Sunil Patil, Los Altos, CA (US); Deyu Jiao, Seattle, WA (US); Rajesh RC, Sunnyvale, CA (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 18/958,570

(22) Filed: Nov. 25, 2024

(51) Int. Cl.
　　　*G06F 9/455*　　　　　(2018.01)
(52) U.S. Cl.
　　　CPC .. *G06F 9/45558* (2013.01); *G06F 2009/4557* (2013.01)
(58) Field of Classification Search
　　　None
　　　See application file for complete search history.

(56) References Cited

U.S. PATENT DOCUMENTS

| | | | |
|---|---|---|---|
| 12,056,024 B1 * | 8/2024 | Mathad | G06F 9/505 |
| 12,093,709 B1 * | 9/2024 | Chraim | H04L 43/0852 |
| 2023/0305876 A1 * | 9/2023 | Sharma | G06F 11/0793 |

OTHER PUBLICATIONS

Lee, Sangmin, "Shard Manager, A Generic Shard Management Framework for Geo-distributed Applications", Facebook, Inc., SOSP 2021, Oct. 26-29, 2021, https: dl.acm.org doi pdf 10.1145 3477132. 3483546, (Oct. 2021), 17 pgs.
Tang, Chunqiang, "Twine: A Unified Cluster Management System for Shared Infrastructure", Facebook, Inc., https: research.facebook. com file 214174457337055 Twine-A-Unified-Cluster-Management-System-for-Shared-Infrastructure-v2.pdf, (Nov. 2020), 17 pgs.

(Continued)

*Primary Examiner* — Bradley A Teets
*Assistant Examiner* — Melissa A Headly
(74) *Attorney, Agent, or Firm* — Schwegman Lundberg & Woessner, P.A.

(57)　　　　　　　ABSTRACT
A method of scaling open-source container orchestration platforms is provided. The open-source container orchestration platform has a first plane that is associated with regional agents each having an object group is provided. A second plane is associated with each object group where the object groups have a pod group. Each pod group has an availability zone divided into sub-availability zones where the availability zones are associated with the second plane. Each of the availability zones has a first sub-availability zone configured to substitute functionality of a second sub-availability zone of the availability zones when the second sub-availability zone becomes non-functional. Moreover, each of the availability zones can be further subdivided to include additional sub-availability zones when demand increases thereby scaling an open-source container orchestration platform implementing the availability zones.

14 Claims, 5 Drawing Sheets

(56) References Cited

OTHER PUBLICATIONS

Tirmazi, Muhammad, "Borg: the Next Generation", EuroSys '20, Apr. 27-30, 2020., https: storage.googleapis.comgweb-research2023-media pubtools pdf 5bf4ebfbf98ead7f6ee1552860fab88e75a5ed7e. pdf, (Apr. 2020), 14 pgs.

Verma, Abhishek, "Large-scale cluster management at Google with Borg", https: static.googleusercontent.com media research.google. com en pubs archive 43438.pdf, (Apr. 2015), 18 pgs.

Zhang, Harry, "PinCompute: A Kubernetes Backed General Purpose Compute Platform for Pinterest", Pinterest Engineering, https: medium. com pinterest-engineering pincompute-a-kubernetes-backed-general-purpose-compute-platform-for-pinterest-8ad408df2d6f, (Oct. 31, 2023), 28 pgs.

* cited by examiner

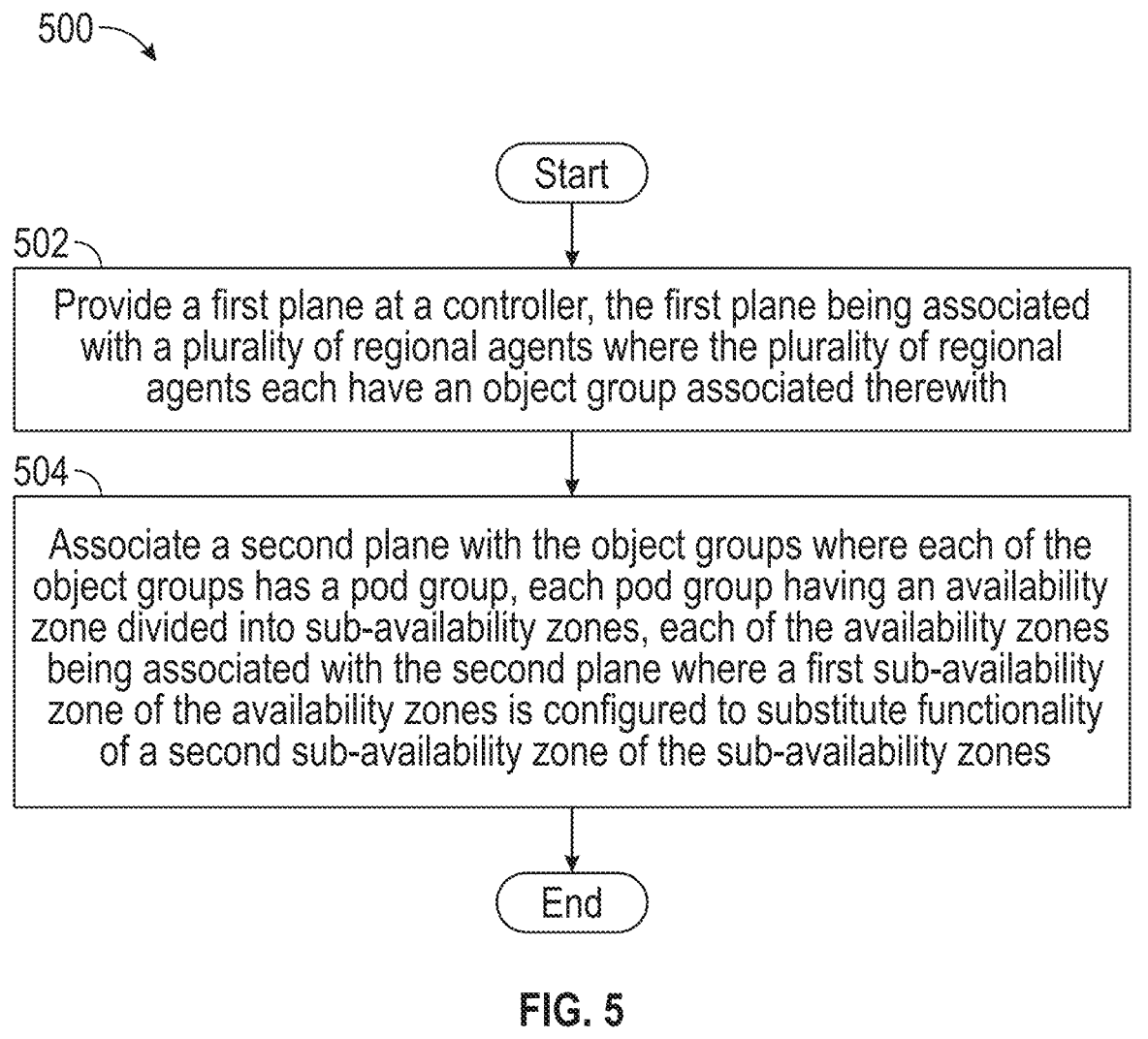

500

Start

502

Provide a first plane at a controller, the first plane being associated with a plurality of regional agents where the plurality of regional agents each have an object group associated therewith

504

Associate a second plane with the object groups where each of the object groups has a pod group, each pod group having an availability zone divided into sub-availability zones, each of the availability zones being associated with the second plane where a first sub-availability zone of the availability zones is configured to substitute functionality of a second sub-availability zone of the sub-availability zones End

FIG. 5

CONTAINER ORCHESTRATION USING SILOED AVAILABILITY ZONES

TECHNICAL FIELD

Examples relate generally to open-source container orchestration platforms and, more particularly, but not by way of limitation, to scaling container orchestration platforms.

BACKGROUND

A container orchestration platform can be used to manage containerized applications and microservices at scale for many nodes and pods. Open-source container orchestration platforms can schedule containers across various nodes, restart failed containers, and scale applications up or down in response to demand. Open-source container orchestration platforms can also optimize hardware utilization and resource allocation along with providing built-in service discovery and load balancing for containerized applications. However, while an instance of an open-source container orchestration platform can be scaled, open-source container orchestration platforms are limited regarding an amount of available scaling. Therefore, different cloud providers have to be used to address the scaling limits of open-source container orchestration platforms.

Another problem that can occur with open-source container orchestration platforms can relate to fault domains and failures. For example, an open-source container orchestration platform instance can implement an application interface (API) server and a user of the open-source container orchestration instance may detect a software error and shut down the open-source container orchestration platform instance. When the open-source container orchestration platform instance is shut down, this becomes a full failure for end-users. In particular, the open-source container orchestration platform is incapable of performing any functions for end-users.

BRIEF DESCRIPTION OF THE DRAWINGS

Various ones of the appended drawings merely illustrate example examples of the present disclosure and should not be considered as limiting its scope.

FIG. 5 shows a method for managing resources across multiple planes in a distributed system, according to some examples.

DETAILED DESCRIPTION

Figure 1:
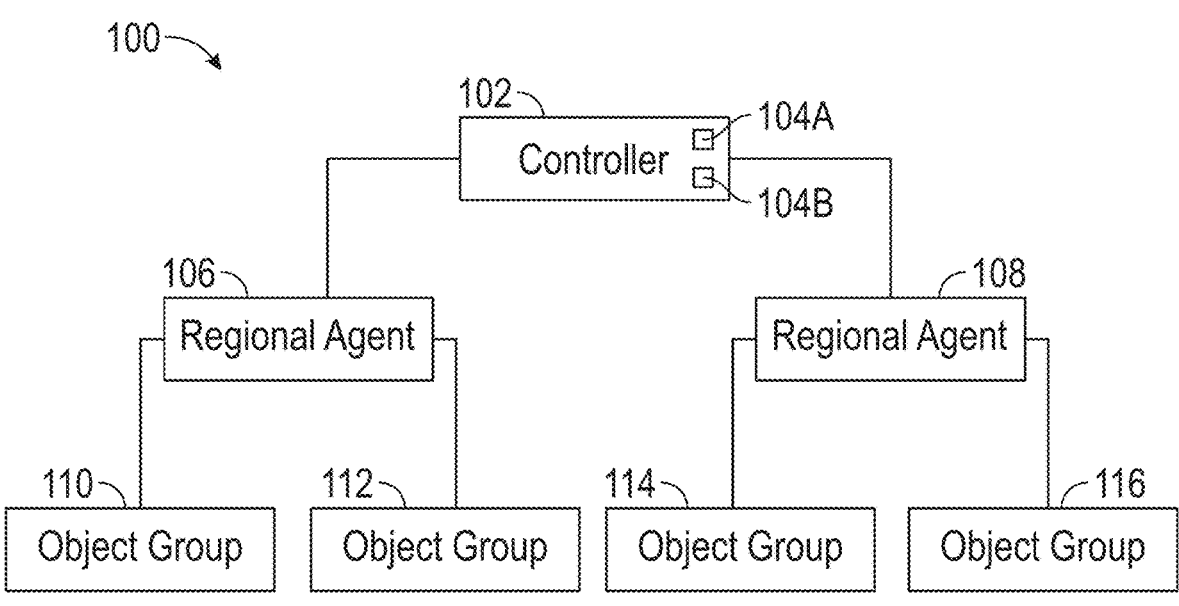
FIG. 1 illustrates an open-source container orchestration platform having regional agents and object groups associated with the regional agents, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to systems and methods that can distribute workloads across an open-source container orchestration platform. While open-source container orchestration is described herein, examples are not limited to such. Thus, any type of orchestration platform can be envisioned by the disclosure herein. The systems and methods described herein can improve scaling capabilities and fault tolerance of environments that utilize open-source container orchestration platforms. Fault domains can be logically distributed over a node of a pod group associated with an object group. The node can be logically separated into availability zones. As used herein, an availability zone can be a fault domain within a node. The availability zone can refer to a distinct and isolated location within the infrastructure of a cloud provider. Each availability zone can be independent of each other. Thus, the hardware infrastructure for each availability zone can be separate from each other such that each availability zone can have their own power, cooling, and networking infrastructure. By logically and physically isolating each availability zone, high availability and fault tolerance and can be provided. When applications are deployed across multiple availability zones, the reliability and resilience of applications can be enhanced, thereby minimizing the risk of downtime due to localized failures.

A control plane can be utilized that deploys APIs and manages the open-source container orchestration platform across the availability zones. As used herein, a control plane can be responsible for managing and controlling how data flows through a network. The control plane can make decisions relating to how data can be routed and processed. A data plane can also be deployed at each of the availability zones. As used herein, a data plane can refer to a forwarding plane or a user plane that can be responsible for the movement and processing of data packets through a network. Applications at object groups within nodes of each availability zone can run via the data plane. Here, the data planes across availability zones for a node can be identical. Thus, if one of the availability zones can no longer function, the data planes for the functioning availability zones can assume control for the object groups in the availability zone that can no longer function. Therefore, the object groups in the non-functioning availability zone can continue to function. Moreover, when the non-functioning availability zone becomes operational again, the object groups can migrate back to the previously non-functioning availability zone.

Each of the availability zones can be divided into sub-availability zones and siloed from each other. Further, each of the sub-availability zones can be associated with the same data plane. Thus, if an availability zone has three sub-availability zones, a failure at one of the sub-availability zones will not affect the other two sub-availability zones. If a failure occurs at one of the sub-availability zones, the functionality provided by the sub-availability zone at which the failure occurred can be migrated to the sub-availability zones that are still functional. Moreover, when the failure is corrected, functionality can be migrated back to the sub-availability zones from the other sub-availability zones.

By virtue of dividing availability zones into sub-availability zones, scalability of the open-source container orchestration platform can be increased. More specifically, as needs of the open-source container orchestration platform increase, further availability zones can be added, either in the form of availability zones at object groups or in the form of sub-availability zones at individual availability zones of object groups.

Examples improve the functioning of computing devices. As noted above and will be described in greater detail below, examples relate to expanding the processing capabilities of computing devices. In particular, as the output requirements of a computing device increase, the scalability of the open-source container orchestration platform can be increased by adding availability zone and subdividing existing availability zones. In addition, the sub-divided availability zones can perform fail safe functions where each of the sub-divided availability zones can be associated with the same data plane. Thus, if a failure occurs at one of the sub-divided availability zones, the functions of the failed sub-divided availability zone can migrate to another of the sub-divided availability zones, thereby maintaining functionality of the failed sub-divided availability zone to end-users.

Figure 2:
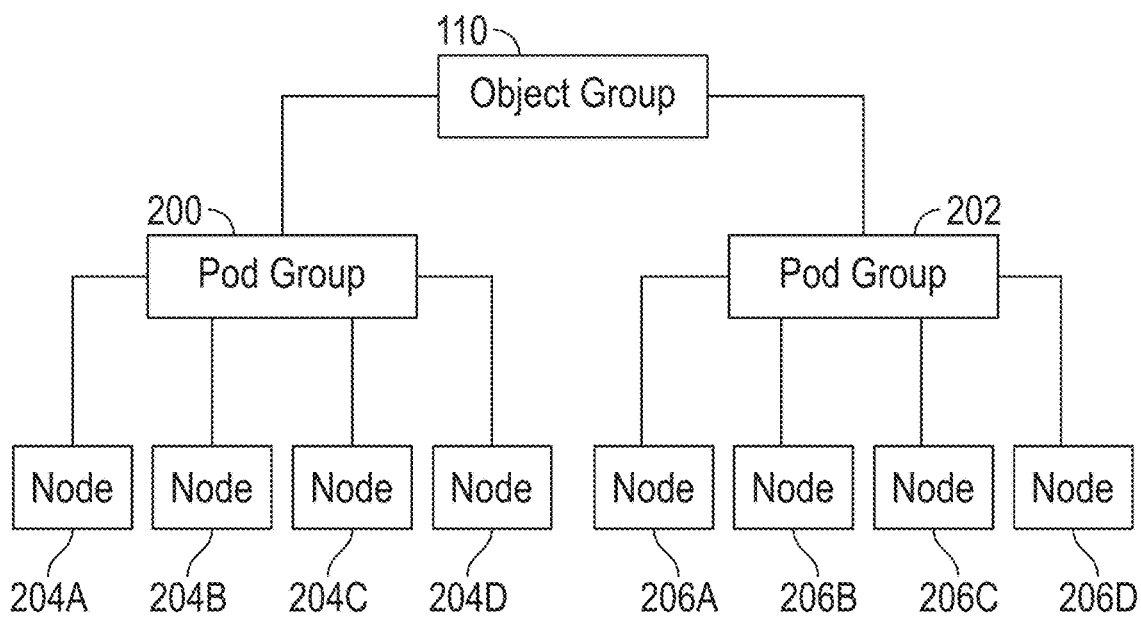
FIG. 2 is an architecture of an object group of FIG. 1 having pod groups, according to some examples.
Figure 3:
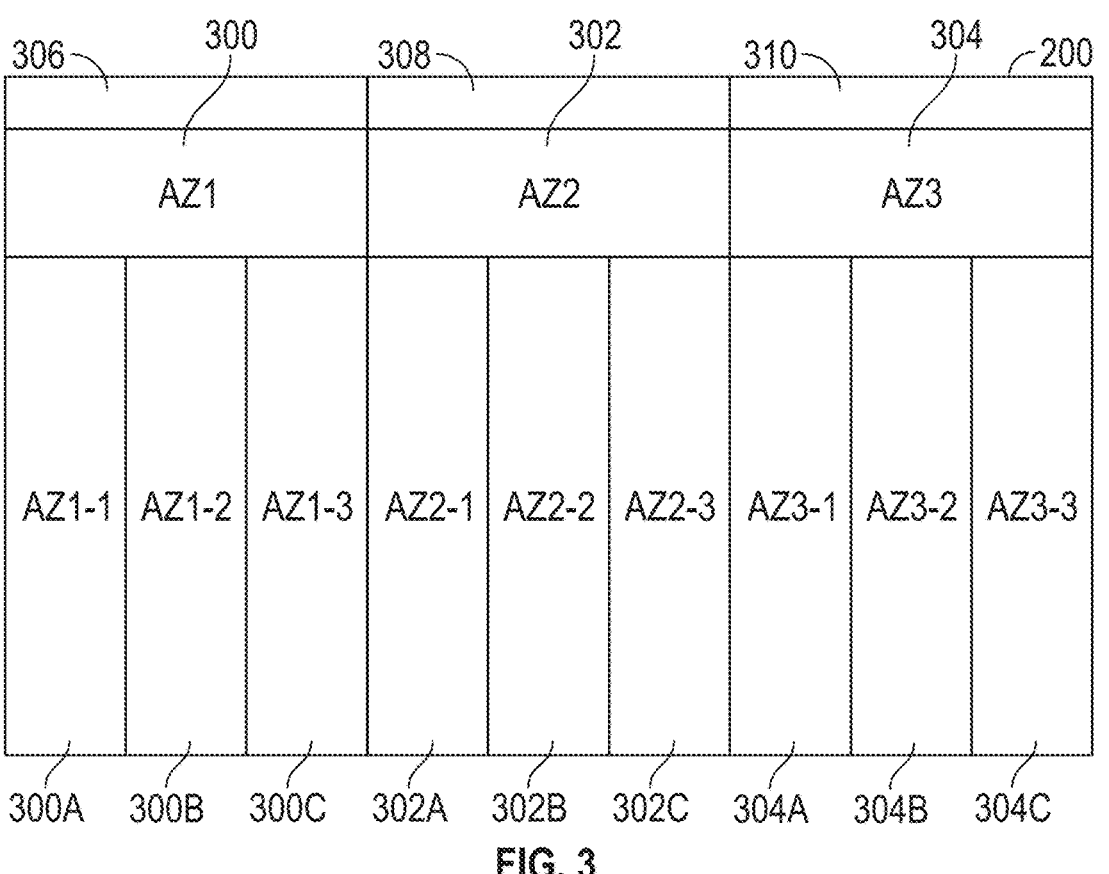
FIGS. 3 and 4 illustrate an architecture of a pod group of FIG. 2, according to some examples.

Now making reference to FIG. 1, an environment 100 is shown in which examples can operate. The environment 100 can implement an open-source container orchestration platform. The environment 100 can include a controller 102 having a control plane 104A. The controller 102 can function to manage the deployment and scaling of resources across the environment 100. The controller 102 can, via the control plane 104A, deploy APIs and oversee the orchestration platform across availability zones 300-304 (FIG. 3). In examples, the controller 102 can function as a State Store, a Persistence API, or a Regional Store. The controller 102 can have a traffic controller that can monitor an operational state of pods 204A-204D and 206A-206D (FIG. 2). The controller 102 can also issue commands to adjust a number of virtual machines at each of the pods 204A-204D and 206A-206D based on changes in demand. This can ensure efficient resource allocation while simultaneously maintaining high availability and fault tolerance.

In some examples, the controller 102 can also have an abstraction layer 104B. The abstraction layer 104B can function to provide a simplified interface to underlying systems, such as regional agents 106 and 108 along with object groups 110-116 that can allow for easier interaction and management. The abstraction layer 104B can hide any complexities of underlying hardware or software, thereby enabling interaction with the system. In some examples, the abstraction layer 104B can translate high-level commands into lower-level operations thereby facilitating communication between different components of a system.

The regional agents 106 and 108 can be associated with managing the object groups 110-116. The regional agent 106 and be associated with the object groups 110 and 112 while the regional agent 108 can be associated with the object groups 114 and 116. The regional agents 106 and 108 can interact and be associated with the control plane 104A to coordinate resources and operations across the availability zones 300-304.

The regional agent 106 can be responsible for managing regions defined by the object groups 110 and 112. The regional agent 106 can ensure that resources are efficiently allocated and managed within regions associated with the object groups 110 and 112. Similarly, the regional agent 108 can be responsible for managing regions defined by the object groups 114 and 116. The regional agent 108 can ensure that resources are efficiently allocated and managed within regions associated with the object groups 114 and 116.

The regional agents 106 and 108 can provide a unified view of an application status of nodes associated with the regional agents 106 and 108. For example, the regional agents 106 and 108 can indicate how many nodes in pod groups 200 and 202 (FIG. 2) are functional and how many pods in the pod groups 200 and 202 are non-functional.

Furthermore, the regional agents 106 and 108, which can be associated with the controller 102, can be responsible for determining the states of the object groups 110-116. For example, the regional agents 106 and 108 can determine if additional nodes should be deployed for any of the object groups 110-116 and/or whether or not any of the nodes associated with any of the object groups 110-116 should be upgraded. The regional agents 106 and 108 can also determine if any of the nodes 204A-204D and 206A-206D should be redeployed or if any of the pod groups 200 and 202 should be reconfigured.

The object groups 110-116 can be resources that are respectively associated with and managed by the regional agents 106 and 108. The object groups 110-116 can define clusters having the pod groups and nodes. To further illustrate, making reference to FIG. 2, the object group 110 can include the pod groups 200 and 202. The pod group 200 can be associated with the nodes 204A-204D while the pod group 202 can be associate with the nodes 206A-206D. Discussion made herein with respect to the object group 110 is also applicable to the object groups 112-116. Similarly, discussion made herein with respect to the pod group 200 is also application to the pod group 202.

The pod groups 200 and 202 can manage and maintain the respective nodes 204A-204D and 206A-206D. The nodes 204A-204D and 206A-206D can be a group of one or more containers that can share storage resources along with network resources. The nodes 204A-204D and 206A-206D can be any type of computing device, as described herein. Each of the nodes 204A-204D and 206A-206D can include several components. To further illustrate, each of the nodes 204A-204D and 206A-206D can include an ordinal, stable storage, and a stable network identity. Moreover, each of the nodes 204A-204D and 206A-206D can represent an application instance that can run an application within a cluster associated with the object group 110 as described further below. Examples of an application instance that each of the nodes 204A-204D and 206A-206D run can include Apache Kafka™, Kafka™ structured query language (KSQL), SchemaRegistry, Connect, or the like.

The pod group 200 in combination with the nodes 204A-204D can define a cluster. Similarly, the pod group 202 in combination with the nodes 206A-206D can define a cluster. The clusters can be associated with the object group 110. The clusters can be homogeneous or heterogeneous. In a homogeneous configuration, all of the nodes can have the same configuration. Thus, if the cluster defined by the nodes 204A-204D is homogeneous, all of the nodes 204A-204D can all have the same configuration. In a heterogenous configuration, subsections of the clusters can have different configurations. Thus, if the cluster defined by the nodes 206A-206D is heterogenous, the nodes 206A and 206B can have a first configuration while the nodes 206C and 206D can have a second configuration different from the first configuration.

As noted above, examples improve scaling capabilities and fault tolerance of environments that utilize open-source container orchestration platforms through the use of dividable availability zones. In order to achieve this functionality, each of the pod groups 200 and 202 can have availability zones that can be divided into sub-availability zones. The availability zones can be specified from any entity, including but not limited to a cloud provider. Making reference to FIG. 3, the pod group 200 can include the availability zones 300-304. The availability zone 300 can be divided into sub-availability zones 300A-300C. The availability zone 302 can be divided into sub-availability zones 302A-302C. The availability zone 304 can be divided into sub-availability zones 304A-304C.

A data plane 306 can be associated with the availability zone 300 and the pod group 200. The data plane 306 can be a layer at which applications can run. The data plane 306 can facilitate the routing of data from a sender, such as a virtual private cloud, to ones of the nodes 204A-204D. The data plane 306 can employ virtual machines having data plane proxies. The data plane proxies can mediate and control network communication between a sender and the nodes 204A-204D. The virtual machines can be based on computer architectures and provide functionality associated with physical computers. Thus, in examples, the virtual machines can correspond to physical computers such that the data plane can also correspond to physical computers in the context of improving performance of a computing device. The availability zone 302 can have a data plane 308 associated therewith. Likewise, the availability zone 304 can be associated with a data plane 310. Each of the data planes 308 and 310 can have the same functionality as the data plane 306.

The sub-availability zones 300A-300C, 302A-302C, and 304A-304C can function as individual fault domains. In particular, each of the sub-availability zones 300A-300C, 302A-302C, and 304A-304C can be siloed from each other. Thus, if one of the sub-availability zones 300A-300C, 302A-302C, and 304A-304C becomes non-functional, such as being taken down for maintenance, upgrades, failure, or the like, the other of the sub-availability zones 300A-300C, 302A-302C and 304A-304C will not be affected.

The sub-availability zones that are associated with the same availability zone share the same data plane. Since the sub-availability zones 300A-300C share the data plane 306, when one of the sub-availability zones 300A-300C becomes non-functional at a first time period, the functionality of the non-functional sub-availability zone can migrate to the other of the sub-availability zones 300A-300C that remain functional without a loss in data provided to the node serviced by the non-functional sub-availability zone via the data plane 306. Furthermore, when functionality returns to the previously non-functional sub-availability zone of the sub-availability zones 300A-300C at a second time period later than the first time period, the services provided by the other of the sub-availability zones 300A-300C can migrate back to the previously non-functional sub-availability zone of the sub-availability zones 300A-300C, without a loss in data provided to the node serviced by the previously non-functional sub-availability zone.

A number of sub-availability zones at each of the availability zones 300-304 can dynamically vary based on the needs of nodes that are associated with the object groups 110-116. Thus, if the processing needs of the pod group 200 increase, additional sub-availability zones can be added to ones of the availability zones 300-304. Moreover, if the processing needs of the pod group 200 decrease, sub-availability zones can be taken down at ones of the availability zones 300-304.

Figure 4:
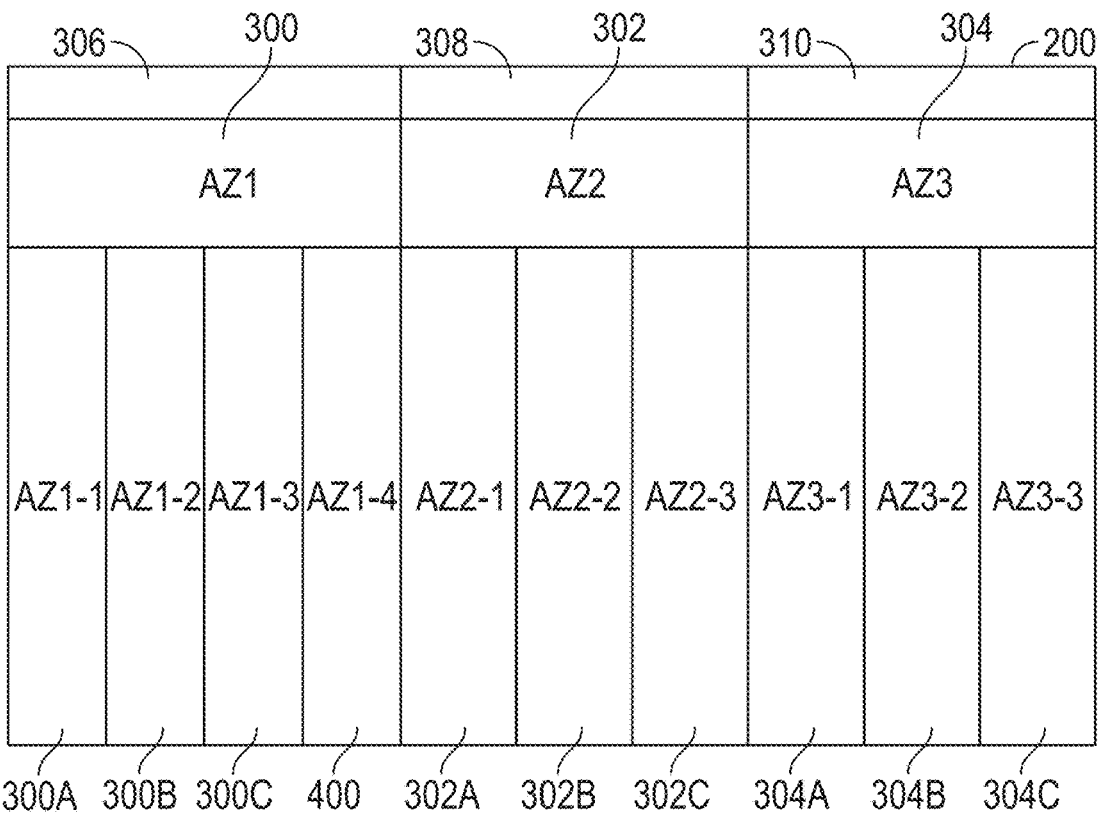

As the demand needs increase for an availability zone, the availability zone can be scaled by further dividing the availability zone of the object group to create additional sub-availability zones. To further illustrate, making reference to FIG. 4, the needs of the nodes served by the availability zone 300 may increase. This can occur due to an increase in processing requirements, an increase in the number of the nodes being serviced by the availability zone 300, or any other scenario where end-user needs can increase. Regardless of the reason, a sub-availability zone 400 can be added to the availability zone 300, thereby increasing the ability of the availability zone 300 and the object group 110 to meet the needs of end-users. In addition to further sub-dividing availability zones, increased demand can be met by providing additional nodes to the pod group. The additional nodes can be added in addition to further sub-dividing an availability zone or instead of further sub-dividing an availability zone.

The availability zones 300-304 can correspond to virtual machines that are available to assist with data routing to clusters, such as routing data from a sender to the nodes 204A-204D. In examples, the availability zones 300-304 and the associated virtual machines are initially provisioned to the pod group 200. Thus, in instances where virtual machines are provisioned to the pod group 200, the virtual machines can route traffic corresponding to data from sender to the nodes 204A-204D.

Now making reference to FIG. 5, a method 500 for managing resources across multiple planes in a distributed system is shown. Initially, the method 500 performs an operation 502 where a first plane can be provided at a controller. The first plane be associated with a plurality of regional agents where each of the regional agents are responsible for managing specific regions within the system. The first plane can be a control plane or an abstraction layer, as described above. The plurality of regional agents can each have an associated object group.

As an illustration of the method 500 and referred to herein as "the illustration," making reference to FIGS. 1 and 2, during the operation 502, the controller 102 can be provided with the control plane 104A. The control plane 104A can be associated with the regional agents 106 and 108, where the regional agent 106 can be associated with the object groups 110 and 112. Furthermore, the regional agent 108 can be associated with the object groups 114 and 116. As discussed above, the regional agents 106 and 108 can respectively control traffic associated with the object groups 110-116.

Returning to FIG. 5, from operation 502, the method transitions to operation 504 where a second plane is associated with the object groups. The object groups can each be a pod group where each pod group has at least one availability zone. Each pod group can also be provided with second planes, such as a data plane. By virtue of the association between the object groups and the pod groups, since each pod group is assigned with the second plane, the object groups can be associated with the second plane. The second plane can be a data plane, as described above.

As described above, the availability zones can have sub-availability zones. Moreover, a first sub-availability zone within a given availability zone can be configured to substitute the functionality of a second sub-availability zone within the given availability zone, also as discussed above.

Returning to the illustration and FIGS. 2 and 3, during the operation 504, data planes are associated with each of the object groups 110-116. Each of the object groups have pod groups, such as the object group 110 having the pod groups 200 and 202. Moreover, each of the pod groups of the object groups 110-116 are associated with a data plane, such as the pod group 200 being associated with the data planes 306-310, as detailed above. Since the object groups 110-116 have associated pod groups and each of the pod groups have data planes, such as the pod group 200 having the data planes 306-310, the object groups 110-116 are associated with data planes.

Additionally, each of the data planes have availability zones, such as the data plane 306 having the availability zone 300. Moreover, as detailed above, the availability zone 300 has the sub-availability zones 300A-300C, which as previously discussed, share the data plane 306. Since the sub-availability zones 300A-300C share the data plane 306, when one of the sub-availability zones 300A-300C becomes non-functional, the functionality of the non-functional sub-availability zone can migrate to the other of the sub-availability zones 300A-300C that remain functional.

Any of the machines, databases, or devices shown in FIGS. 1 and 2 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 6 and 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements of the computing environment 100 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-5 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 6:
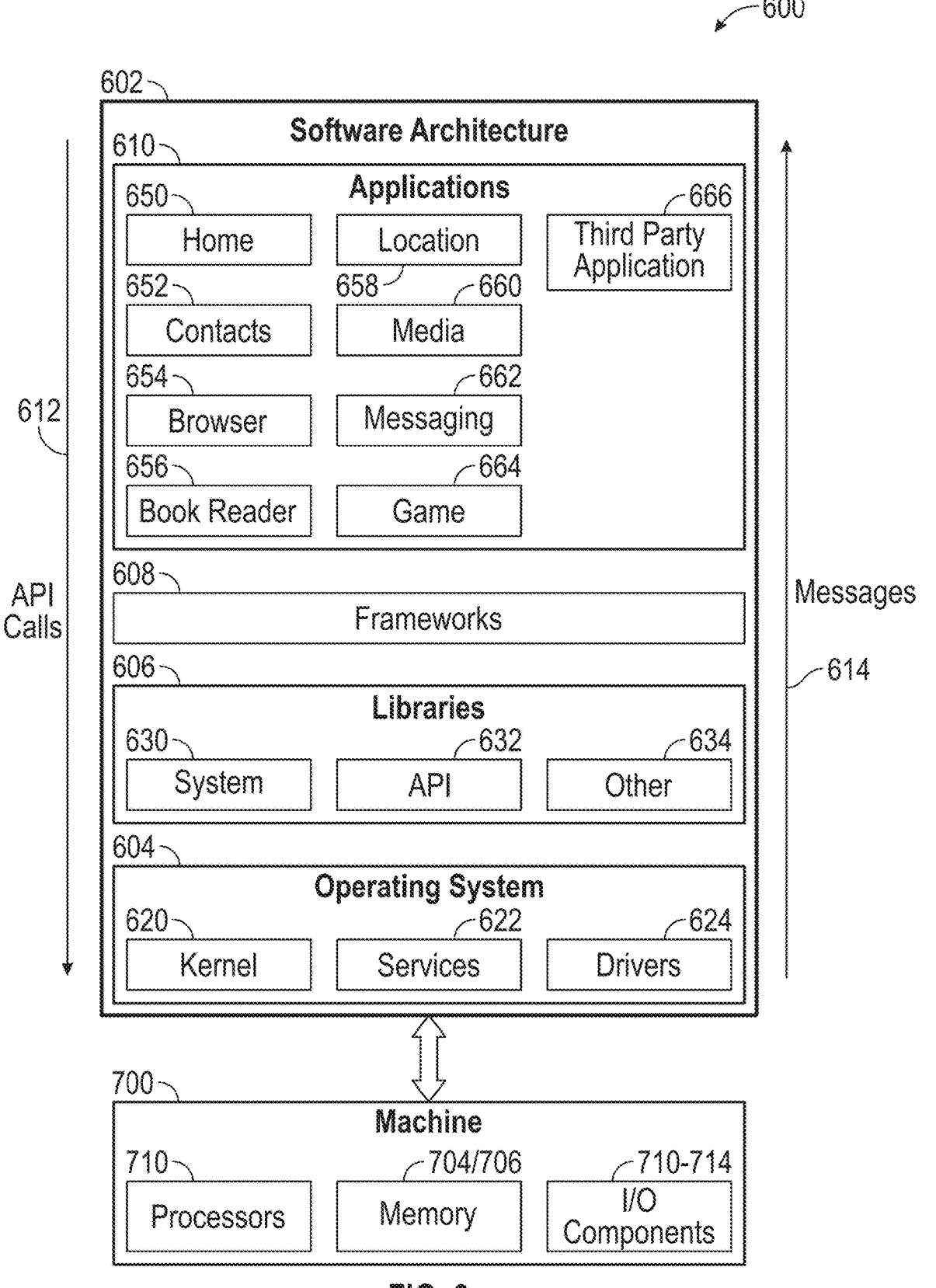
FIG. 6 is a block diagram illustrating architecture of software used to implement displaying an interactive user interface, according to some examples.
Figure 7:
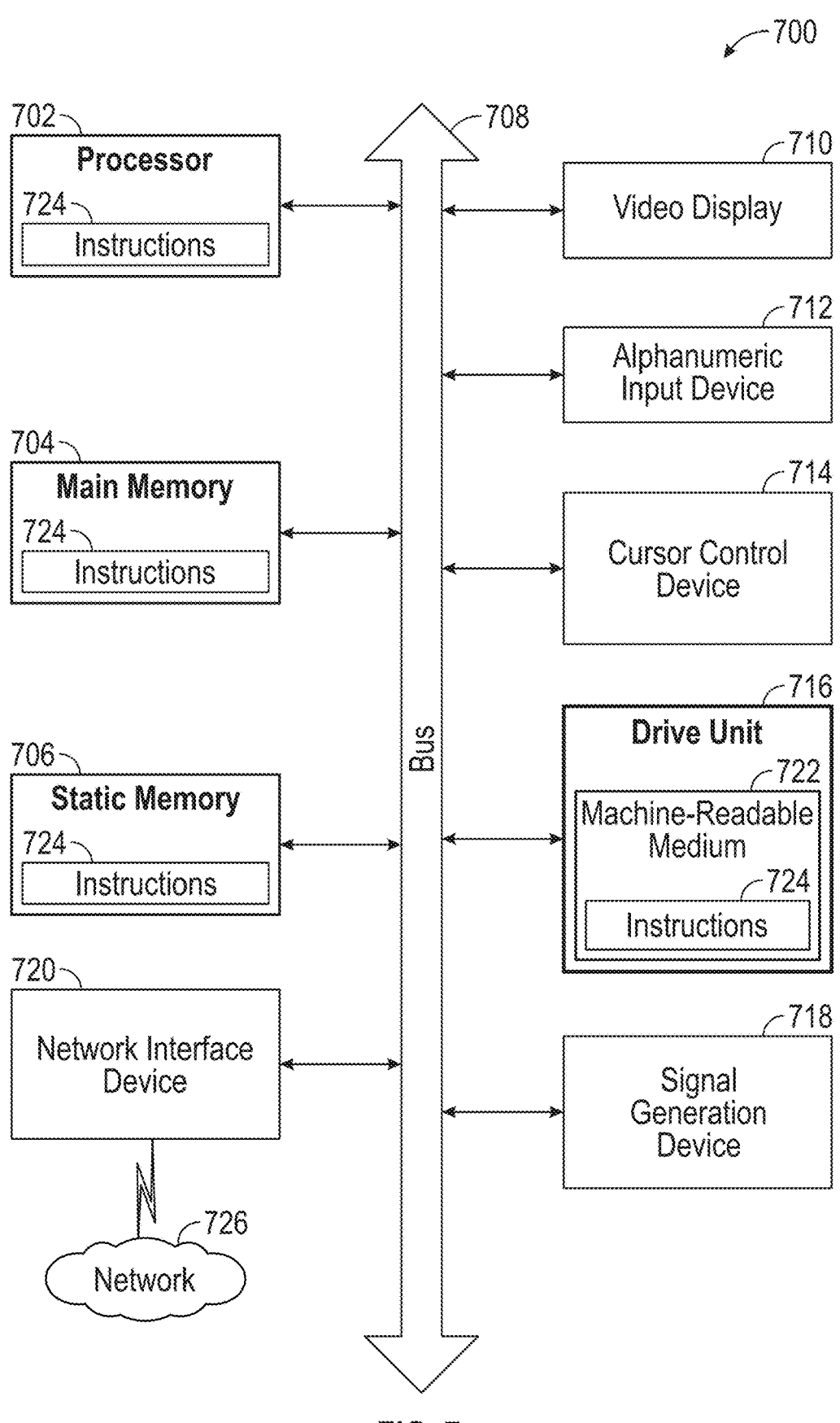
FIG. 7 shows a machine as an example computer system with instructions to cause the machine to implement displaying an interactive user interface, according to some examples.

FIG. 6 is a block diagram 600 illustrating a software architecture 602, which may be installed on any one or more of the devices described above. FIG. 7 is merely a non-limiting example of a software architecture, and it will be appreciated that many other architectures may be implemented to facilitate the functionality described herein. The software architecture 602 may be implemented by hardware such as a machine 700 of FIG. 7 that includes a processor 702, memory 704 and 706, and I/O components 710-714. In this example, the software architecture 602 may be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 712 through the software stack and receive messages 614 in response to the API calls 612, according to some implementations.

In various implementations, the operating system 604 manages hardware resources and provides common services. The operating system 604 includes, for example, a kernel 620, services 622, and drivers 624. The kernel 620 acts as an abstraction layer between the hardware and the other software layers in some implementations. For example, the kernel 620 provides memory management, processor management (e.g., scheduling), component management, networking, and security settings, among other functionality. The services 622 may provide other common services for the other software layers. The drivers 624 may be responsible for controlling or interfacing with the underlying hardware. For instance, the drivers 624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 606 provide a low-level common infrastructure that may be utilized by the applications 610. The libraries 606 may include system libraries 630 (e.g., C standard library) that may provide functions such as memory allocation functions, string manipulation functions, mathematic functions, and the like. In addition, the libraries 606 may include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 may also include a wide variety of other libraries 634 to provide many other APIs to the applications 610.

The frameworks 608 provide a high-level common infrastructure that may be utilized by the applications 610, according to some implementations. For example, the frameworks 608 provide various graphic user interface (GUI) functions, high-level resource management, high-level location services, and so forth. The frameworks 608 may provide a broad spectrum of other APIs that may be utilized by the applications 610, some of which may be specific to a particular operating system or platform.

In an example, the applications 610 include a home application 650, a contacts application 652, a browser application 654, a book reader application 656, a location application 658, a media application 660, a messaging application 662, a game application 664, and a broad assortment of other applications such as a third-party application 666. According to some examples, the applications 610 are programs that execute functions defined in the programs. Various programming languages may be employed to create one or more of the applications 610, structured in a variety of manners, such as object-orientated programming languages (e.g., Objective-C, Java, or C++) or procedural programming languages (e.g., C or assembly language). In a specific example, the third-party application 666 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 666 may invoke the API calls 612 provided by the mobile operating system (e.g., the operating system 604) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 7 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 700, which can be a computer system, includes the processor 702 (e.g., a central processing unit (CPU), a graphics processing unit (GPU) or both), a main memory 704 and a static memory 706, which communicate with each other via a bus 708. The machine 700 may further include a video display unit 710 (e.g., a liquid crystal display (LCD) or a cathode ray tube (CRT)). The machine 700 also includes an alphanumeric input device 712 (e.g., a keyboard), a user interface (UI) navigation device (cursor control device) 714 (e.g., a mouse), a disk drive unit 716, a signal generation device 718 (e.g., a speaker) and a network interface device 720.

The drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the machine 700, the main memory 704 and the processor 702 also constituting machine-readable media. Instructions 724 may also reside within the static memory 706.

While the machine-readable medium 722 is shown in an example to be a single medium, the term "machine-readable medium" may include a single medium or multiple media (e.g., a centralized or distributed database, and/or associated caches and servers) that store the one or more instructions or data instructions 724. The term "machine-readable medium" shall also be taken to include any tangible medium that is capable of storing, encoding or carrying instructions 724 for execution by the machine and that cause the machine to perform any one or more of the methodologies of the present invention, or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media include nonvolatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 724 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Executable Instructions and Machine Storage Medium

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of network, such as the network-based system may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system, comprising:
at least one processor; and
at least one memory including instructions that, when executed by the at least one processor, cause the at least one processor to perform operations comprising:
   providing a first plane at a controller, the first plane being associated with a plurality of regional agents associated with a plurality of object groups where each regional agent of the plurality of regional agents comprises an object group of the plurality of object groups associated therewith;
   associating a second plane with an object group of each of the plurality of object groups, the object group having a pod group where:
      each pod group of the plurality of object groups has an availability zone divided into sub-availability zones, a number of sub-availability zones in the availability zone dynamically varying based on processing changes of nodes associated with the object groups;
      each of the availability zones are associated with the second plane, the second plane employing virtual machines having a plurality of data planes that mediate and control network communication; and
      a first sub-availability zone of the availability zones being configured to substitute functionality of a second sub-availability zone of the sub-availability zones, the first sub-availability zone and the second sub-availability zone sharing a data plane of the plurality of data planes where the first sub-availability zone has first functionality and the second sub-availability zone has second functionality;
   adding additional sub-availability zones to the availability zone by further dividing the availability zone based on the processing changes;
   migrating the second functionality of the second sub-availability zone to the first sub-availability zone based on a failure of the second sub-availability zone;
   monitoring an operational state of the second sub-availability zone to detect when the second sub-availability zone becomes functional after the failure; and
   based on the second sub-availability zone becoming functional after the failure, migrating the second functionality back to the second sub-availability zone, where the shared data plane minimizes data loss during the migrations.

2. The system of claim 1, wherein the instructions further cause the system to perform operations comprising adding a third sub-availability zone in response to a change in demand.

3. The system of claim 2, wherein each of the first sub-availability zone, the second sub-availability zone, and the third sub-availability zone are siloed from each other.

4. The system of claim 3, wherein the pod group has a plurality of pods and the instructions further cause the system to perform operations comprising scaling the pod group to include additional nodes in response to a change in demand.

5. The system of claim 1, wherein the pod group has a plurality of pods and the instructions further cause the system to perform operations comprising scaling the pod group to include additional nodes in response to a change in demand.

6. The system of claim 1, wherein the first plane is a control plane and the second plane is a data plane.

7. The system of claim 1, wherein the first plane is an abstraction layer and the second plane is a data plane.

8. A method comprising:

providing a first plane at a controller, the first plane being associated with a plurality of regional agents associated with a plurality of object groups where each regional agent of the plurality of regional agents comprises an object group of the plurality of object groups associated therewith;

associating a second plane with an object group of each of the plurality of object groups, the object group having a pod group where:

each pod group of the plurality of object groups has an availability zone divided into sub-availability zones, a number of sub-availability zones in the availability zone dynamically varying based on processing changes of nodes associated with the object groups;

each of the availability zones are associated with the second plane, the second plane employing virtual machines having a plurality of data planes that mediate and control network communication; and a first sub-availability zone of the availability zones being configured to substitute functionality of a second sub-availability zone of the sub-availability zones, the first sub-availability zone and the second sub-availability zone sharing a data plane of the plurality of data planes where the first sub-availability zone has first functionality and the second sub-availability zone has second functionality;

adding additional sub-availability zones to the availability zone by further dividing the availability zone based on the processing changes;

migrating the second functionality of the second sub-availability zone to the first sub-availability zone based on a failure of the second sub-availability zone;

monitoring an operational state of the second sub-availability zone to detect when the second sub-availability zone becomes functional after the failure; and based on the second sub-availability zone becoming functional after the failure, migrating the second functionality back to the second sub-availability zone, where the shared data plane minimizes data loss during the migrations.

9. The method of claim 8, comprising:

adding a third sub-availability zone in response to a change in demand and each of the first sub-availability zone, the second sub-availability zone, and the third sub-availability zone being siloed from each other; and scaling the pod group to include additional nodes in response to a change in demand.

10. The method of claim 8, wherein the pod group has a plurality of pods and the method further comprises scaling the pod group to include additional nodes in response to a change in demand.

11. The method of claim 8, wherein the first plane is one of a control plane or an abstraction layer and the second plane is a data plane.

12. A machine-storage medium having instructions embodied thereon, the instructions executable by at least one hardware processor to perform operations comprising:

providing a first plane at a controller, the first plane being associated with a plurality of regional agents associated with a plurality of object groups where each regional agent of the plurality of regional agents comprises an object group of the plurality of object groups associated therewith;

associating a second plane with an object group of each of the plurality of object groups, the object group having a pod group where:

each pod group of the plurality of object groups has an availability zone divided into sub-availability zones, a number of sub-availability zones in the availability zone dynamically varying based on processing changes of nodes associated with the object groups;

each of the availability zones are associated with the second plane, the second plane employing virtual machines having a plurality of data planes that mediate and control network communication; and a first sub-availability zone of the availability zones being configured to substitute functionality of a second sub-availability zone of the sub-availability zones, the first sub-availability zone and the second sub-availability zone sharing a data plane of the plurality of data planes where the first sub-availability zone has first functionality and the second sub-availability zone has second functionality;

adding additional sub-availability zones to the availability zone by further dividing the availability zone based on the processing changes;

migrating the second functionality of the second sub-availability zone to the first sub-availability zone based on a failure of the second sub-availability zone;

monitoring an operational state of the second sub-availability zone to detect when the second sub-availability zone becomes functional after the failure; and based on the second sub-availability zone becoming functional after the failure, migrating the second functionality back to the second sub-availability zone, where the shared data plane minimizes data loss during the migrations.

13. The machine-storage medium of claim 12, wherein the operations comprise:

adding a third sub-availability zone in response to a change in demand and each of the first sub-availability zone, the second sub-availability zone, and the third sub-availability zone being siloed from each other; and scaling the pod group to include additional nodes in response to a change in demand.

14. The machine-storage medium of claim 12, wherein the pod group has a plurality of pods and the operations further comprise scaling the pod group to include additional nodes in response to a change in demand.

\* \* \* \* \*